United States Patent [19]

Ballard

[11] Patent Number: 5,143,625

[45] Date of Patent: Sep. 1, 1992

[54] METHOD AND APPARATUS FOR CLARIFYING LIQUID USING A PULSATING SLUDGE BED AND PART OF CONCENTRATED SLUDGE

[75] Inventor: P. Temple Ballard, Richmond, Va.

[73] Assignee: Infilco Degremont, Richmond, Va.

[21] Appl. No.: 658,018

[22] Filed: Feb. 20, 1991

[51] Int. Cl.$^5$ ............................................. C02F 1/56
[52] U.S. Cl. ................................. 210/713; 210/715;
210/727; 210/738; 210/195.3; 210/205;
210/220; 210/802; 210/803; 210/522
[58] Field of Search ............................. 210/713–715,
210/725, 727, 728, 738, 195.3, 205, 206, 220,
802, 803, 521, 522

[56] References Cited

U.S. PATENT DOCUMENTS

| | | | |
|---|---|---|---|
| 3,068,172 | 12/1962 | Leviel et al. | 210/715 |
| 3,523,889 | 4/1970 | Eis | 210/713 |
| 3,728,253 | 4/1973 | Kaufman | 210/715 |
| 3,788,981 | 1/1974 | Richard et al. | 210/715 |
| 4,059,531 | 11/1977 | Tardivel | 210/522 |
| 4,156,644 | 5/1979 | Richard | 210/748 |
| 4,388,195 | 6/1983 | von Hagel et al. | 210/713 |
| 4,724,085 | 2/1988 | Pohoreski | 210/713 |
| 4,728,438 | 3/1988 | Featherstone et al. | 210/713 |

Primary Examiner—Peter Hruskoci
Attorney, Agent, or Firm—Staas & Halsey

[57] ABSTRACT

There is disclosed a pulsating sludge bed clarifier especially for the treatment of low turbidity waters, which uses incline plates in the sludge bed and some recirculated sludge. The clarification is greatly enhanced by recirculating a relatively small part of the sludge concentrate to a reactor chamber used for the premixing of water to be treated and the coagulant. The small amount of recirculated sludge cuts down significantly on the polymer flocculant, which is the most expensive chemical in the process that is required to be used, and can also serve to improve the adsorption of colors and similar materials, increase the density of the sludge blanket, and improve the rate of throughput of the system.

6 Claims, 1 Drawing Sheet

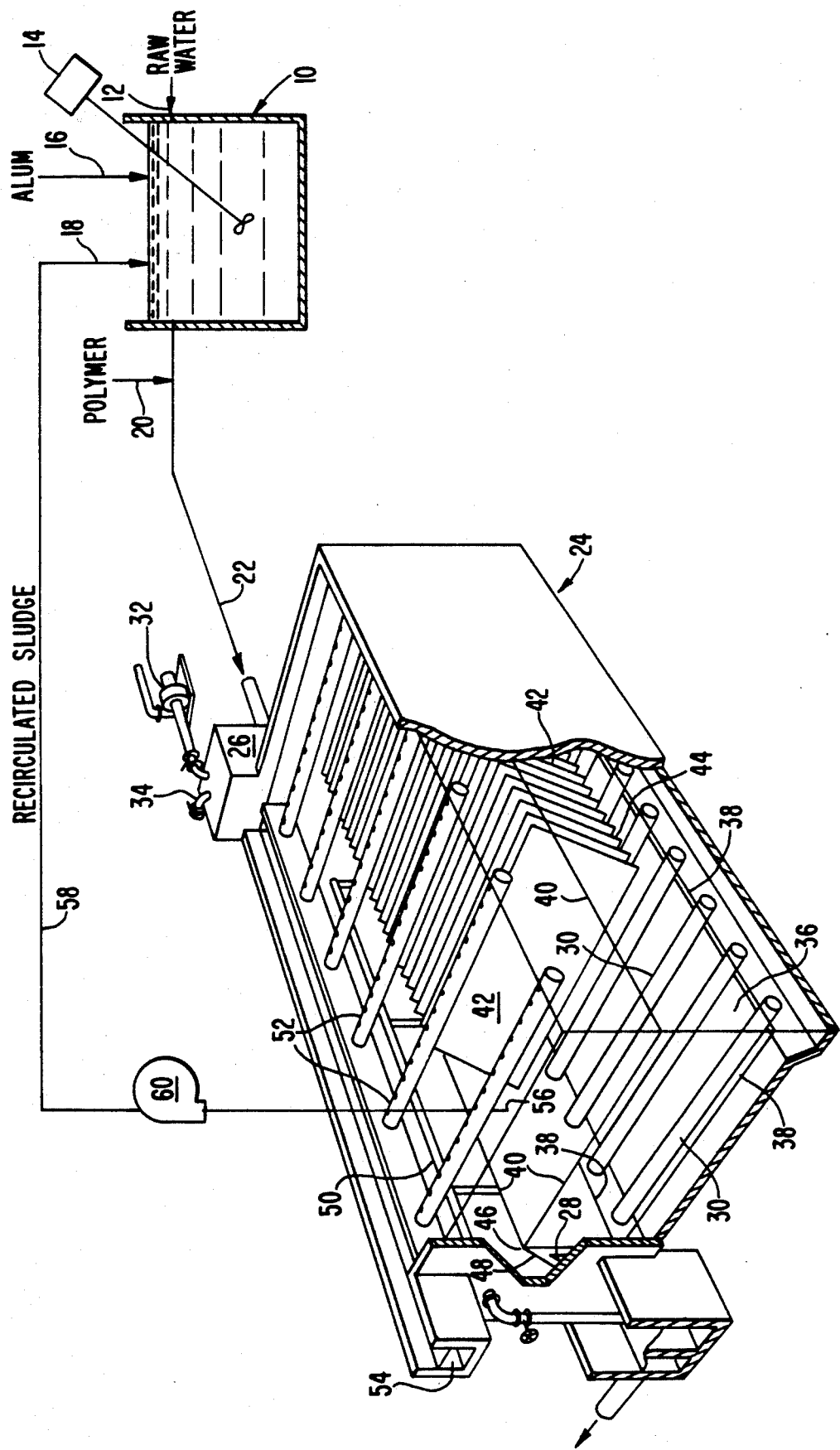

METHOD AND APPARATUS FOR CLARIFYING LIQUID USING A PULSATING SLUDGE BED AND PART OF CONCENTRATED SLUDGE

This invention relates to an improved pulsating sludge bed clarifier for treatment of liquids and especially water for drinking water or industrial uses.

Clarification is a way of treating water to make it clear by removing impurities. Suspended matter can be removed from the water by agglomerating it into particles large enough to settle by gravity. Coagulating chemicals provides the means by which small particles coalesce into larger particles and the amount and rate of coalescence is a function of the degree of interparticle contact. After introduction of coagulating chemicals, a small slow settling floc is formed. If the liquid mass is gently agitated, contact between the particles increases and they grow in size. The flocculation is greatly improved when it takes place in the presence of previously formed floc particles. The newly formed particles deposit by accretion on the surface of those already present so that they grow in size at a much higher rate producing a heavier, faster settling floc.

One of the best current methods for clarification is to use a sludge blanket process which takes advantage of the phenomena just mentioned. The coagulating chemicals are added to the raw water which flows into a mass of previously formed solids for flocculation and separation.

In most clarifiers using this process, mechanical agitation mixes the chemicals and water and is followed by upward percolation through a suspension of previously formed solids known as a "sludge bed" or "sludge blanket". Successful operation depends upon a relatively static suspension of the particles in equilibrium with the upward flow. Such a suspension is inherently stratified and non-homogenous and irregularities in bed density exist. The rising water naturally tends to flow through the irregularities where the sludge is less concentrated and, by doing so, it displaces the sludge still further from that particular zone. As a result, the sludge blanket gradually settles into a compact mass through which the rising water has made a localized passage way. Effective contact between the water and the sludge mask has been lost in that area.

A different action results when the water flows upward through the sludge blanket intermittently—in a cycling or pulsating flow. During surging flow, the bed expands uniformly. During subsiding flow, the bed settles uniformly, as it would in a liquid at rest. As a result of pulsating flow, the blanket remains homogenous throughout, with no stratification, maintaining continuous effective contact between water and sludge.

The volume occupied by a blanket of sludge varies with upward flow. It expands as flow increases—up to a limit beyond which the particles become separated from each other, the bed looses the characteristics of a mass, and the particles are carried out of the tank by the water. As concentration increases, the settling rate also increases to a certain value beyond which it decreases. Each type of sludge has a maximum settling speed, hence, rise rate which cannot be exceeded.

A pulsating sludge blanket may be likened to a coiled spring. It is compressed by the force of gravity but will be extended by the counter force of the friction of the water on particles constituting this spring. The spring extends more and more as the upward velocity increases to the point of breaking if overstressed. Overstressing a sludge blanket must be avoided by establishing an optimum vertical velocity. Moreover, the resistance of this spring may be improved by developing a heavier floc, with the use of flocculant aids, such as polyelectrolytes. Sludge characteristics vary with the water being treated, the chemicals used, the dosages and the operation.

The pulsations are usually caused by taking a part of the water and pulling it up into a chamber by vacuum and then permitting the water to recede from the chamber under the flow of gravity at a controlled rate to cause the pulse to the system including the sludge blanket. This method has been improved by a super high speed clarifier-flocculator which combines the advantages of a highly concentrated sludge blanket kept in expansion by the pulsations and the internal circulation of the flocculated sludge effected by a system of inclined plates with deflectors which are located within the sludge blanket and allow very high upward flow rates. By this improved technique the old pulsating high speed clarifiers which could be operated at one to three gallons per minute per square foot have been increased several fold to 2-8 gallons per minute, per square foot or even better.

The improvements in speed were achieved by the incorporation of inclined plates with deflectors inside the sludge blanket which served to retain at least the same blanket concentration as previous pulsating clarifiers but at a higher upward flow rate.

These previous methods and apparatus just referred to are available in the United States from Infilco Degremont Inc., P. O. Box 29599, Richmond, Va. 23229 and are more fully described in that company's brochures Superpulsator Clarifier DB585 of June, 1984 and Pulsator ® Clarifier DB580 of June, 1976 as well as U.S. Pat. Nos. 3,068,172; 3,788,981; 4,059,531 and 4,156,644, which patents and brochures are incorporated herein by reference.

The present invention is a substantial improvement over the pulsating sludge bed clarifier having inclined plates such as shown in U.S. Pat. No. 4,156,644 and brochure DB585 supra. The improvement relates to taking part of the concentrated sludge produced by the clarifier and pumping it through a conduit to the rapid mix or reactor vessel which is used for mixing the coagulant and other chemicals with the raw feed water. This insertion of recycled concentrated sludge provides a number of unexpected advantages; a principal one being to reduce significantly the amount of flocculant required, which is the most expensive chemical that is normally used in the process. Another advantage is the recycled sludge increases the reaction rate by providing a seed floc upon which the new floc can build. A still further advantage is achieved by providing a higher solid content and consequently a higher surface area whereby the removing of color, organics, silica and other materials commonly removed by adsorption is enhanced.

The effectiveness of the sludge blanket is governed by the density of the sludge in the blanket. The sludge blanket may be viewed as acting essentially as a filter for the water that is flowing upward through it. If the blanket is denser and the pore areas within the blanket are smaller, it is more effective at removing the floc that is coming up through the blanket as it comes from the mixing tank or reactor. The recycling of some of the concentrated sludge results in increasing the density of the sludge blanket so that the total suspended solids in the sludge blanket may be on the order of 35-50% higher when the present invention is utilized. This increased density can result in the production of higher quality water using equivalent chemical feeds or can be used to lower chemical dosages, particularly the flocculant dosages, to accomplish the same results as previously accomplished. Also, the invention increases the throughput for the same capital investment.

The improvements are most evident in low turbidity waters such as those less than 5-10 nephelometric turbidity units which is universally abbreviated as NTU. Turbidity is basically the cloudiness of the water. Waters that have a very low turbidity and waters that do not have significant color problems usually require more coagulant simply to create enough of the floc to make the prior pulsating method effective. As an example, some waters with very low turbidity could be treated with aluminum sulfate dosages as low as 3-5 parts per million, whereas without the sludge recirculation as provided by the present invention, it would be very difficult to run a pulsating sludge blanket with dosages that low—even though the water itself would not have a coagulant demand higher than that and the additional coagulant would not be needed except for the proper functioning of the sludge blanket as used prior to the present invention.

DESCRIPTION OF THE PREFERRED EMBODIMENT

In this description, including the accompanying drawing, there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purpose of illustration in order that others skilled in the art will more fully understand the invention and the principles thereof and will be able to modify it and embody it in a variety of forms, each as may be suited in the conditions of a particular case.

BRIEF DESCRIPTION OF THE DRAWING

The single FIGURE is a schematic perspective of a preferred embodiment of the invention.

DETAILED DESCRIPTION OF THE INVENTION

With reference to the FIGURE, there is shown a rapid mix tank or reactor 10 into which is fed raw water to be treated through conduit 12. Suitable chemicals are added to the reactor chamber 10 and are thoroughly mixed by a mixing arrangement such as a propeller driven by a motor 14. The propeller driven by the motor is merely for purposes of illustration as any suitable mechanical or other mixing arrangement may be utilized. The term reactor chamber and rapid mix chamber are all interchangeable and refer to the same tank. The reactor may be divided or partitioned into different areas each its own mixer with different chemicals being fed to each area. In the example, aluminum sulfate, or alum, one of the most common types of coagulants used in water treatment, is fed to the reactor. The term coagulant covers a wide range of chemicals and is basically a chemical used to change the turbidity in the water so that the turbidity is filterable. Most waste water contains significant colloidal material. The colloidal material is basically very tiny particulates that have an associated physical charge with them, and because these charges are like charges (usually negative) they repel each other and remain in suspension. A coagulant is used to neutralize these charges and thereby allow them to not repel each other and become unstable. The choice of coagulants would be well known to those skilled in the art and would be dependent upon the nature of the water being treated. They are usually metal salts such as alum or aluminum sulfate, ferric sulfate or ferric chloride. The metallic part of these molecules or their ions when disassociated in water have positive valences associated with them and they act upon the colloids to destabilize the colloidal charges that causes the turbidity. When these charges are destabilized they allow the particles that caused the turbidity to come together instead of repelling each other and remaining in suspension. Another effect is that the coagulant serves to absorb the color and actually traps color molecules when the particulates begin to come together. A typical alum treatment is between 15-100 parts per million but more commonly between 15-50 parts per million. This would depend on the nature of the treatment chosen by the operators and the nature of the raw water being treated either for drinking purposes, sewage treatment, or industrial purposes.

Other materials can be added as is well known to those skilled in the art such as lime. Lime is considered a coagulant also but it is also chemically used for softening applications and may be added as a source of bicarbonate alkalinity. In most waters the lime would not be used.

The alum or other coagulant is being shown added through coagulant conduit 16. The raw water and coagulant and other additions in the reactor chamber 10 are uniformly mixed and the coagulation process begins and either goes to completion or at least the majority of the coagulation process occurs.

As shown in the FIGURE, the recirculated sludge is also inserted into the reactor chamber through a recirculated sludge conduit 18. While the embodiment shown indicates the recycled sludge being inserted in the reactor chamber 10 there are several places where it can be optionally inserted. It could be inserted into the raw water line at 12 before the raw water enters the reaction chamber or it could also be inserted into the conduit between the reactor and the vacuum chamber to be described later. Thus, the recycled sludge may be inserted before the coagulant is fed, between the coagulant and the feed of the flocculant and after the flocculant but before the vacuum chamber. The preferred place for inserting the recirculated sludge depends on the application including the raw water and what is being accomplished by the recirculated sludge. However, the most effective place will usually be into the reactor chamber itself and the second most effective place will be prior to the reactor chamber into the raw water.

If the recirculated sludge is fed after the flocculant has been inserted, it would still have some effects because the formed floc in the raw water would have a flocculant on the surface and the recirculated sludge would have flocculant on the surface and they would come together in the vacuum chamber to form particulates. So, even though this would normally be the third choice of the location for insertion, it would still enjoy some of the advantages of the present invention.

It is also important that a suitable flocculant be added. A flocculant is used to pull the particulates together once the charges have been stabilized by the coagulant so that they no longer repel each other. Flocculants in the 1970's and earlier were usually activated silica and naturally occurring materials such as starch have also been used. These flocculants are sometimes referred to as coagulant aids. As chemists began to understand more about organic chemistry, and polymers specifically, they started developing polymers as substitutes for the earlier flocculants and today polymers are almost always used as a flocculant in place of the earlier flocculants because they are more effective economically. There are numerous types of polymers that form suitable flocculants and these are well known and widely available to the water treatment industry. A person skilled in the art usually uses polymers and flocculants as convertible terms, but in reality, when the term polymer is used it is referring to a polymer flocculant. The polymer flocculants come with various types of charges, such as positive charge, negative charge or neutral. If they are positively or negatively charged, it depends on the strength of the charges as to when they would be used. The selection is well within the knowledge of a person skilled in the art. One preferred polymer is Betz 1100P (available from Betz Chemicals Company, Somerton Road, Trevose, Pa. 19047), a high-molecular weight anionic polymer which may be used at approximately 0.1 parts per million. The polymer flocculant as shown in the FIGURE is preferably inserted through polymer flocculant conduit 20 just after the water leaves the reactor chamber 10.

The flocculant is generally added after the coagulant but it can be added to the rapid mix reactor. Generally coagulation is more efficient if there is a longer time period between the addition of the coagulant and the flocculant—particularly in cold water. While in some plants the coagulant and flocculant are added simultaneously, in others the flocculant is generally added on an order of two to five minutes after the coagulant. But some plants add the coagulants at or before the raw water enters the reactor chamber, so there is a long coagulation time. Coagulants and flocculants may be added in the reactor chamber with the coagulant being added just as water enters the chamber and the polymer just before the water exits the chamber. There is no absolute rule for doing it in this manner.

The raw water after being mixed with the coagulant and flocculant is inserted through conduit 22 into pulsating sludge bed clarifier 24. The raw water with added reagents enters through the raw water inlet pipe 22 into the vacuum chamber—a sealed chamber 26. The raw water is fed through the duct 28 at the bottom of the vacuum chamber and extends into the main part of the clarifier. This duct is not seen fully in the FIGURE, but is more fully shown in brochure DB585 supra. From the duct the raw water is distributed through a number of perforated raw water distribution laterals 30 which are spaced parallel to one another near the bottom of the main tanks of the clarifier 24. The perforations are on the bottom of the laterals so the water enters the main tank by flowing from the bottom of the laterals in between the bottom of the laterals and the bottom of the tank.

The pulsating system comprises a blower 32 which sets up a vacuum in the vacuum chamber 26 causing the raw water with reagents to rise in the chamber. A dual timer (not shown) preset for a defined vacuum-vent cycle actuates an atmospheric vent valve 34 on the vacuum chamber, opening it at a high level and closing it at a low level so that the water stored in the chamber drains rapidly into the bottom distribution system, after which the vacuum chamber is refilled. The pulsations uniformly expand the entire sludge blanket 36. The sludge blanket is shown in the FIGURE as extending between a bottom horizontal plane 38 and a top horizontal plane 40. These may be referred to as the sludge blanket bottom surface 38, the sludge blanket top surface 40.

The pulsations uniformly expand the entire surface area of the sludge blanket during each high-flow pulse without short circuits and without favoring any particular part.

The vacuum chamber 26 is proportional to the area of the main tank and is between ⅛ and 10% of the volume of the main tank of the clarifier. It is pulsed usually once to twice a minute and preferably every 40 seconds.

The uniformly spaced perforated laterals 30 distributed the coagulated but not yet fully flocculated water throughout the area of the clarifier apron. The hydraulic distribution is very effective because of the low resistance in the duct 28 and laterals 30, and because of the substantial head pressure available in the vacuum chamber 26 to feed the perforations in the laterals 30.

Substantial hydraulic energy is released at the outlet holes or perforations at the bottom of the distribution laterals 30 during the rapid drainage of the water stored in the vacuum chamber 26. Jets with a speed of up to approximately 13' per second vigorously agitate the raw water and reagents, bringing into suspension the heaviest matter which tends to settle, and achieving complete homogenization at the clarifier distribution level.

The system of hydraulic pulsations imparts a high velocity gradient to this mixture. This high velocity gradient is obtained by jetting the raw water and reagents from the perforations in the bottom of the distribution laterals 30, and ensures good mixing and optimum use of reagents.

This mixing is in addition to the mixing in the rapid mix tank or reactor 10.

After the mixture of reagents and raw water are discharged from the laterals 30, the mixture enters the sludge blanket 36, the bottom of which is at approximately the same level as the distribution laterals 30.

This mixture then proceeds to flocculate in the presence of the already formed sludge in the blanket, which speeds up the process.

The volume available between the floor and the level of the bottom of the inclined plates 42 represents a contact time of 5–15 minutes depending upon the upward flow rate used, and constitutes a medium of moderate concentration. As a result flocculation is already well underway when the ascending water enters the plates at the bottom.

The system of plates 42 are more fully explained in the U.S. Patents and brochures supra but involves a number of parallel plates inclined at preferably 60 degrees to the horizontal and positioned at right angles to the side walls of the pulsating sludge bed clarifier 24 to form a set of inclined channels, each fed with the same flow because of the uniform distribution provided by the laterals 30 at the bottom. The plates 42 are fitted with critically positioned deflectors (not shown in the drawings but shown in the patents and brochures supra) which also act as supports and stiffeners. The deflectors give rise to internal recirculation of the flocculated and thickened sludge throughout the interplate space 44 without breaking up the floc as may occur in systems featuring mechanical recirculation.

It is this interplate zone 44 that the sludge blanket reaches its maximum concentration, giving optimum floc growth in minimum time. The concentration achieved is very efficient for the upward flow rates utilized.

Mixing, coagulation, and flocculation takes place over a vertical height of approximately 10' which corresponds to a contact time of 15-30 minutes depending on the upward flow rate used. Flocculation thus reaches its optimum degree in a highly concentrated sludge medium.

The sludge blanket is compact and allows the settling rate to be increased; and this result is obtained without artificially increasing the weight of the floc which would be an approach that would seriously impede both operation and maintenance.

The volume of the sludge in the sludge blanket 36 increases owing to the impurities entrained by the raw water and the reagents injected. The pulsations also give the sludge blanket a tendency to rise, and so the upper level of the sludge blanket 40 is limited by overflowing the lip or weir 46 into sludge concentrator 48 where no thrust due to the upward flow rate is exerted. Therefore the excess sludge concentrates in the sludge concentrator 48 before being discharged by intermittent automatic extractions through main sludge extraction pipe 50.

The excess sludge extraction has no effect on the sludge blanket concentration, as it does in clarifiers having extractors within the blanket.

The sludge at floor level is appreciably less concentrated than that between the plates 42, and because of the pulsations, all the sludge tends to rise to the level of the upper edge or lip 46 of the sludge concentrator 48 and does not accumulate at the bottom of the unit. However, particles escaping from the sludge blanket 40 can still settle because the plates 42 are extended upward above the level of the lip 46.

The clarified water is collected through submerged holes in a closely spaced network of pipes or small prefabricated channels 52 and are discharged from the pipes 52 into a main discharge channel or clarified water outlet channel 54.

The clarified water collection system using water pipes 52 operates uniformly and adequately over the entire surface of the clarifier 24 and has the advantage of being unaffected by accumulations of solids in appliances and by variations in flow.

Part of the concentrated sludge in sludge concentrator 48 is pulled into the inlet end 56 of recirculated sludge conduit 58 by means of recirculated sludge pump 60. The inlet end 56 is submerged into the sludge concentrate contained in the sludge concentrator 48. The recirculated sludge then passes through the recirculated sludge conduit 58 where it is discharged from the discharge end for recirculated sludge at 18. The discharge end, as stated earlier, may be located for insertion into the system before the coagulant is fed or between the coagulant and flocculant or after the flocculant, but it is preferably fed into the rapid mix or reactor chamber 10.

The amount of recirculated concentrated sludge is governed by the flow of the actual and overall process and by several factors. One of the main factors is the concentration of the actual sludge in the sludge concentrator. For example, if there is ½-1% concentrate, the sludge going from the concentrator back to the mix tank would be an amount to create a solids level in the mix tank in the order of 20-100 parts per million total suspended solids (TSS). This concentration varies with the application. It is not a specific percentage because it is relative to how dense the sludge in the concentrate actually is and must be chosen for the different applications.

The invention is primarily useable with waters having very low turbidity. With very low turbidity waters the amount of sludge being recycled will usually be an amount to provide a TSS of 20 to 100 mg/liter in the reactor. Of these total solids approximately 75% will be from the recycled sludge.

The recycling of part of the concentrated sludge back to the reactor enhances the efficaciousness of the process as part of the floc in the concentrated recirculation sludge provides a seed floc upon which additional floc can be built beginning in the reactor. There is an advantage to have a surface area of material that an effort is going to be built upon when it is the same material, whether it is aluminum hydroxide, ferric hydroxide or other similar materials. If an available amount of the material is already present, the new molecules will cause a crystallization to proceed at high reaction rate when there is already material there. A second advantage is that having a higher solids in the reactor of the mixing tank with a higher surface area provides an advantage in removing color, organics, silica, and any materials that are commonly removed by adsorption. A third advantage is that the recirculated concentrated sludge that has already been through the coagulation/flocculation process has a polymer on the surface, some of which is going to adhere to the newly formed sludge and a lot of the newly formed sludge will actually form on the surface of the pre-existing sludge. This cuts down significantly on the polymer dosage required. And, since polymer is the most expensive chemical that is normally used in the process, greatly enhances the economics of the process. It may cut the percentage of polymer used by as much as 50% and at least 25-30%. As an alternative to cutting down on the amount of polymer used, the flow through the system can be increased to obtain comparable results which cuts down on the required capital investment. The sludge blanket is more effective at removing floc because adding concentrated recirculated sludge at the beginning of the process increases the density of the sludge blanket such that the total suspended solids may be in the order of 35-50% higher which allows for either the production of higher quality water using equivalent chemical feeds or allow for the use of lower chemical dosages, particularly flocculant and/or polymer dosages.

The recirculated sludge pump 60 can be any of the suitable types which are available from a number of manufacturers, but a progressive cavity pump is preferred.

The clarified water outlet channel can conduct the water directly for use such as for industrial water, or conduct the water through a filtration treatment for drinking water.

Several arrangements may be used for automatic, intermittent extraction of this sludge through main sludge extraction pipe 50. In one configuration, the extraction pipe is fitted with an automatic valve together with a backing manual valve. The most commonly used automatic valves are compressed air diaphragm types. The specific sludge extraction system does not form part of this invention, but suitable types can be found with reference to the U.S. Patents and brochures listed supra.

The system of the present invention, as in all clarifiers, has an upward flow rate that depends upon the characteristics and minimum temperature of the water, the treatment applied, and the required quality of the clarified water. Using a flocculation agent, rates of 2-4 gallons per minute, per square foot are typical for ground or surface water treatment using plates in the sludge blanket. The rates over the area as a whole depends on the rate previously adopted for the surface of the sludge blanket and the area of the clarifier. This in turn depends on the amount of suspended solids in the raw water and on the reagents used. A new and efficacious method and apparatus for clarifying water using a pulsating sludge blanket with inclined plates with part of the concentrated sludge being recirculated externally from the clarifier to the rapid mix tank o reactor has been described which greatly enhances previous apparatus and methods of a similar type.

It is to be understood that the following claims are intended to cover all of the generic and specific features of the invention herein described and it is to be understood that this specific embodiment herein shown is not to be construed in the limiting sense but is merely to depict and illustrate the principles of the present invention. Modifications may be devised by those with skill in the art which will not depart from the spirit or scope of protection as set forth in the following claims.

What is claimed is:

1. An apparatus for treatment of water, comprising:
   a source of water to be treated;
   a source of a suitable coagulant to add to said water;
   a source of a suitable flocculant to add to said water;
   a pulsating sludge bed clarifier;
   a sludge blanket within said clarifier having a top surface and a bottom surface;
   a vacuum chamber connected to said clarifier for causing said clarifier to pulsate;
   a conduit and mixing tank containing a mechanical stirring device into which said source of coagulant and said source of water is inserted to combine and mix said coagulant and said water;
   a conduit connecting said mixed water and coagulant to said vacuum chamber;
   a flocculant conduit for connecting said source of flocculant for discharge into said mixture of water and coagulant prior to said vacuum chamber;
   a sludge recycle conduit for removing part of said sludge from said clarifier and inserting it into said mixing tank so that said sludge can mix with said water and said flocculant prior to said water flowing into said clarifier;
   a sludge discharge conduit for removing excess sludge from said clarifier; and
   a water discharge conduit for removing clarified water from said clarifier.

2. The apparatus of claim 1, wherein said clarifier includes a system of inclined parallel plates forming inclined channels between said plates positioned within said sludge blanket and extending above said top surface of said sludge blanket.

3. The apparatus of claim 2, wherein:
   said clarifier includes a sludge concentrator adapted to receive excess sludge from said sludge blanket which overflows into said sludge concentrator; and
   said sludge recycle conduit has its inlet in the sludge in said concentrator; and
   a pump in said sludge recycle conduit for removing some of the sludge from said sludge concentrator through said inlet.

4. A method for treatment of water comprising the following steps:
   provide a source of water to be treated;
   provide a source of a suitable coagulant;
   provide a source of a suitable flocculant;
   forming a body of said water in a clarifier;
   forming a sludge blanket in said body of water with a top surface and a bottom surface;
   removing some of the water from said body of water and returning it to said body of water by a vacuum chamber connected to said clarifier on a periodic basis to pulsate said sludge blanket;
   mixing said water and said coagulant by stirring with mechanical stirring device within a mixing tank;
   transferring said mixture of said water and coagulant and inserting it into said body of water in said clarifier;
   inserting said flocculant into said mixture of said water and said coagulant prior to said mixture being inserted into said vacuum chamber;
   removing part of said sludge from said clarifier;
   inserting said removed sludge into said mixing tank so that said sludge can mix with said water and said flocculant prior to said water being inserted into said clarifier;
   removing excess sludge from said clarifier through a sludge discharge conduit; and
   removing clarified water from said clarifier through a water discharge conduit.

5. The method of claim 4, wherein said sludge blanket rises and falls in inclined channels formed within said sludge blanket by parallel inclined plates positioned within said sludge blanket and extending above the top surface of said sludge blanket.

6. The method of claim 5, which includes:
   catching any excess sludge from said sludge blanket by overflowing into a sludge concentrator; and
   removing part of said excess sludge from said sludge concentrator for use as said removed sludge inserted into said water prior to said water being inserted in said clarifier.

* * * * *